United States Patent [19]
Pelz et al.

[11] Patent Number: 5,161,935
[45] Date of Patent: Nov. 10, 1992

[54] TRAILER LOAD SHIFTING DEVICE

[75] Inventors: David L. Pelz, Fort Wayne; Marvin W. Houser, Auburn; Mark A. Walchle, Decatur, all of Ind.

[73] Assignee: Navistar International Transportation Corp., Chicago, Ill.

[21] Appl. No.: 691,776

[22] Filed: Apr. 26, 1991

[51] Int. Cl.⁵ ............................................. B62D 37/00
[52] U.S. Cl. ................................ 414/679; 280/407.1; 280/758
[58] Field of Search ...................... 414/679; 280/405.1, 280/407.1, 758, 43.24, 43.23

[56] References Cited
U.S. PATENT DOCUMENTS

| | | | |
|---|---|---|---|
| Re. 23,704 | 9/1953 | De Lay | 280/407.1 X |
| Re. 30,191 | 1/1980 | Mautz | 280/43.24 X |
| 3,019,930 | 2/1962 | Allen | 280/43.24 |
| 3,829,116 | 8/1974 | Burdick | 280/43.23 |
| 3,884,158 | 5/1975 | Rumell | 414/679 X |
| 4,409,903 | 10/1983 | Wilhelmsson et al. | 414/679 X |
| 4,995,774 | 2/1991 | Nusbaum | 280/43.24 X |

Primary Examiner—David A. Bucci
Attorney, Agent, or Firm—Dennis K. Sullivan

[57] ABSTRACT

A trailer load shifting device comprises a framework adapted to ride along a trailer and to which weights are engageable. The framework incorporates wheeled carriers which are retractable and extendable by actuation of air bags positioned between the framework and the wheeled carriers. When the wheeled carriers are retracted, the framework of the device rests upon frame members of the trailer and is engaged to the trailer framework by removable pins. When the pins have been removed, the air bags are filled, extending the wheeled carriers and simultaneously raising the framework off the trailer frame members. Then, upon light snubbing of the brakes of a slowly moving tractor engaged to the trailer, the device can be shfited fore or aft, as desired, by its inertia.

8 Claims, 1 Drawing Sheet

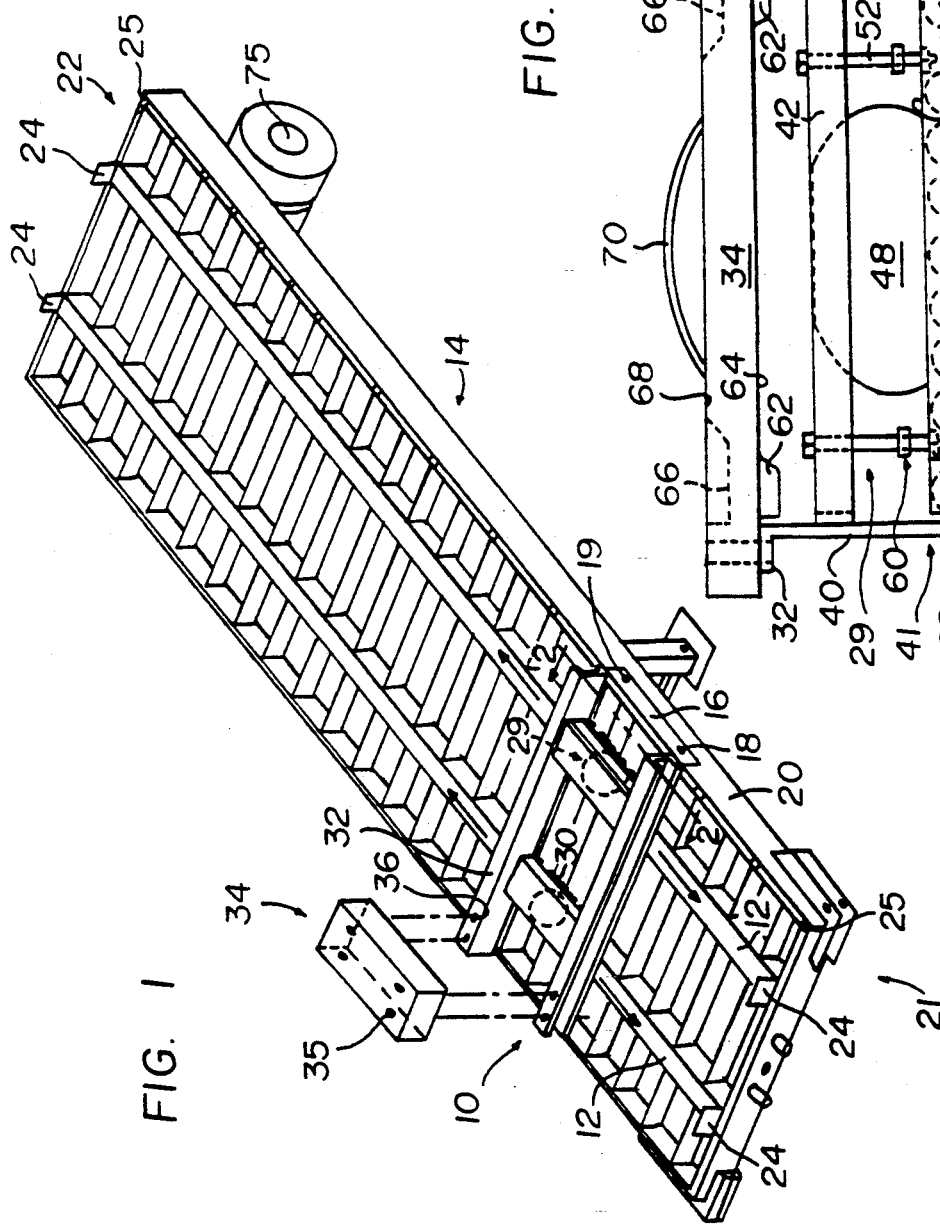
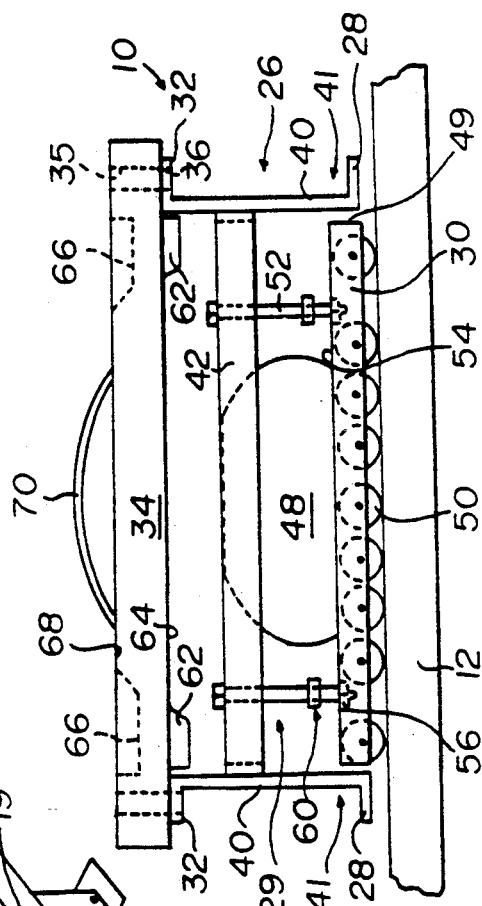

TRAILER LOAD SHIFTING DEVICE

BACKGROUND OF THE INVENTION

The present invention relates to a device which is adapted to be weighted, which is movable along the length of a platform such as a semi-trailer to shift the weight in the fore-and-aft direction therealong, and which can be locked to the trailer at any chosen point.

THE PRIOR ART

Various devices for shifting weight along a platform, such as a semi-trailer, which is to be pulled by a vehicle are known.

For example, trailers having shiftable weights are used to progressively increase the load on a pulling tractor, such as those used in agricultural tractor pulling contests.

SUMMARY OF THE INVENTION

It is a primary object of the invention described and claimed herein to provide a device for shifting the load on a semi-trailer for use, for example, during testing of the brake system of a semi-tractor engaged to the trailer or, in a cargo carrying application, to provide a more equal distribution of a load over the tractor and trailer axles.

A more specific object of the invention is to provide a load shifting device including retractable wheeled carriers for moving the device along frame members of the trailer, an air bag actuation system for the wheeled carriers, and means for locking the device at a predetermined locations along the length of the trailer.

These objects are specifically met in a trailer load shift device having a framework to which weights are engageable. The framework incorporates wheeled carriers which are retractable and extendable by actuation of air bags positioned between the framework and the carriers. When the wheeled carriers are retracted, the framework of the device rests upon frame members of the trailer and is locked to the trailer frame by means of removable pins. When the pins have been removed, the air bags are filled, extending the wheeled carriers beyond a lower edge of the framework and simultaneously raising the framework off the trailer frame members. Then, upon light snubbing of the brakes of a vehicle to which the trailer is engaged, with the vehicle in the appropriate gear, the device may be shifted fore- or-aft along the length of the trailer as desired.

BRIEF DESCRIPTION OF THE DRAWINGS

Other objects and advantages of the invention will become more apparent upon perusal of the detailed description thereof and upon inspection of the drawings in which:

FIG. 1 is a perspective view of a semi-trailer showing one trailer load shifting device of the present invention mounted thereon.

FIG. 2 is a cross section taken along the line 2—2 of FIG. 1 illustrating the trailer load shifting device of the present invention.

DESCRIPTION OF THE PREFERRED EMBODIMENT

Referring now to the drawings, there is illustrated a trailer load shift device 10 of the present invention which engages upon and rides along the top of I-beam rails 12 secured to a flatbed trailer 14. Although only one device 10 is shown upon the trailer 14, it will be understood that a plurality of such devices 10 may be placed upon a single trailer 14. This may be useful in a cargo carrying application to provide a more equal distribution of a load over the tractor and trailer axles.

The device 10 is further adapted to be fixed to the trailer 14 by means of side flanges 16 having openings 18 therein which align with openings (not shown) in outer frame rails 20 of the trailer 14, the openings being adapted to receive pins 19 therein for securing the device 10 at a chosen position along the length of the trailer 14.

The device 10 is capable of riding along the I-beams 12 from one end 21 of the trailer 14 to the other end 22, and, to assure that the device 10 does not fall from either end 21, 22 of the trailer 14, stops 24 are provided thereat as well as bulkhead stops 25 provided at each corner of the trailer 14 which engage the side flanges 16. The device 10 incorporates a framework 26 which is vertically movable relative to the trailer 14, as well as horizontally movable therealong. Upon upward motion of the framework 26, trailer support pads 28 thereof are disengaged from contact with the trailer I-beam rails 12 by actuating means 29 while wheeled carriers 30 are maintained in contact with the I-beam rails 12 to allow the device 10 to be shifted horizontally along the length of the trailer 14. Once appropriately positioned, the actuating means 29 are deactuated and the framework 26 lowers, seating the trailer support pads 28 thereof back onto the I-beam rails 12, with the wheeled carriers 30 sitting idly along the rails 12 between the support members 28.

The frame structure 26, as shown, is comprised of channel beams and further includes upper support members 32 which are adapted to engage and support weights 34 mounted thereon as desired to produce a required load on a semitractor (not shown) to which the trailer 14 is attached, such as for testing of a brake system (not shown) of the tractor. Each weight 34 is approximately 1000 pounds comprises a metal slab 34 having feet 62 on a bottom surface 64 thereof and corresponding grooves 66 in an upper surface 68 thereof for compact, secure stacking of the weights 34. A handle structure 70 on the upper surface 68 thereof so that the weights 34 can be added to or removed from engagement with the frame structure 26 by means of an overhead crane or the like.

To assure secure engagement of each weight 34 directly engaging the upper support members 32, bolts (not shown) may be extended through bores 35 in the weights 34 aligned with bores 36 in the upper support members 32.

FIG. 2, an enlarged cross section of the device 10 at a point of engagement to one I beam rail 12 of the trailer 14 offers a more thorough understanding of the device 10. As shown, the framework 26 is formed of channel beams which are preferably made of tempered steel and includes two upstanding lateral members 40, the channel 41 of each being outwardly directed and having lower and upper flanges which form the support pads 28 and members 32, respectively.

Further, a horizontal channel beam cross piece 42 is secured between the lateral members 40 in a position overlying each I-beam rail 12 of the trailer 14, the channel beam cross piece 42 opening downwardly to receive the top surface 46 of an air bag 48 seated therewithin and extending downwardly therefrom. Suitable valving (not shown) is provided for inflating and deflating the air bag, preferably using the compressed air supply (not shown) commonly available on highway tractors. The air bag 48 forms the actuating means 29 for the extending the wheeled carriers 30 in the embodiment shown.

Beneath the air bag 48 and dependingly engaged to each horizontal cross piece 42 is one wheeled carrier 30 which comprises a downwardly opening channel beam 49 which faces has steel wheels or rollers 50 mounted therein and extending downwardly therefrom.

Each wheeled carrier 30 is engaged to the its respective horizontal cross piece 42 by means of long bolts 52 extending downwardly from the cross piece 42 through a top surface 54 of channel beam 49 of the wheeled carrier 30 and is fixed thereto by positioning nuts 56 which limit the upward range of motion of the horizontal cross piece 42 relative to the wheeled carrier 30. This upward range is such that the wheels 50 may be extended to a position below the trailer support pads 28.

To limit the downward range of motion of the horizontal cross piece 42 relative to the wheeled carrier 30, a stop member 60 is provided at a chosen position along the length of each bolt 52 which provides a distance of downward motion of the frame 26 relative to the wheeled carrier 30 which allows the trailer support pads 28 to seat against the I-beam rail 12 with the wheels 50 resting on the rail 12.

Again, it will be understood that two horizontal cross pieces 42, two wheeled carriers 30, and two actuating means 29 are provided for the device 10 as embodied herein, one of each of the above positioned above each of the two I-beam rails 12 of the trailer 14.

In use, the device 10, is loaded onto the trailer 14 by means of a forklift or the like, weighted appropriately, and then rolled to a desired position. In order to roll the device 10 to the chosen position, the air bags 48 are simultaneously inflated to lift of the trailer support members 28 of the frame structure 26 off the I beam rails 12 of the trailer 14 until only the wheels 50 of the wheeled carriers 30 are seated against the I-beam rails 12. The device 10 then can be moved to the desired location along the length of the trailer 14. This may be accomplished by using a winching device or, if the trailer is connected to a tractor, by slowly moving the tractor in the desired direction and snubbing the brakes lightly to move the device by its inertia.

Once appropriately positioned, each air bag 48 is deflated, allowing a settling of the frame structure 26 until the support pads 28 seat against the I-beam rails 12 once again.

Once seated against the I-beam rails 12 in this manner, and alignment of the holes 18 in the side flanges 16 with the openings in the trailer side rails 20 is provided, pins are set through the flange and side rails 20 to secure the device 10 in position to prevent undesired shifting of the device 10 upon severe braking of the tractor as during testing.

Prior to disengagement of the trailer 14 from a tractor, the air bags 48 are again inflated and the device 10 is moved rearwardly to a position over a rear axle 75 of the trailer 14 so that the trailer 14 does not nosedive when the tractor is disengaged therefrom, the device 10 acting as a counterweight to make disengagement easier.

In the embodiment disclosed, a single air bag 48 having a weight capacity of between 15 and 20 thousand pounds is provided for each wheeled carrier 30. If it were required to lift a load significantly greater than the capacity the single air bag 48 can provide, multiple air bags 48 could be utilized to increase the capacity.

As described above, the trailer load shifting device of the present invention has a number of advantages, some of which have been described above and others of which are inherent in the invention. Also modifications can be proposed to the device without departing from the teachings herein. Accordingly, the scope of the invention is only to be limited as necessitated by the accompanying claims.

We claim:

1. In combination with a semi-trailer, a device for shifting a load along the length of said semi-trailer, said semi-trailer having a pair of longitudinally extending rails in an upper surface thereof, said device comprising:
   a weight supporting framework disposed to engage said upper surface and be releasably fixed thereto, said framework comprises two lateral channel beams engaged to one another by channel beam cross-pieces appropriately positioned therealong, said lateral channel beams each including an upper weight engaging horizontal flange and a lower trailer engaging pad;
   retractable wheeled carriers dependingly engaged to each cross-piece in a manner to be vertically movable relative thereto within predefined limits, said wheeled carriers including wheels extendable to a position where the wheels of said carriers extend below said lower trailer engaging pad of said framework lateral members; and
   actuating means comprising at least one selectively inflatable air bag seated between said cross piece and said wheeled carrier for raising said framework out of engagement with said platform to permit moving said framework along said rails;
   said upper flange of said lateral channel beams including bores therein and said upper horizontal flanges of said lateral channel beams supporting weights thereon, said weights being fixed to said flanges by bolt combinations extending through holes in said weights which align with said bores in said flanges.

2. The device of claim 1 wherein said framework further includes bottom end flanges of said lateral channel beams which extend across and between said lateral channel beams parallel to said wheeled carriers.

3. The device of claim 2 wherein each bottom end flange includes bores therein positioned to align with openings in a trailer side frame member against which said bottom end flange vertically abuts.

4. The device of claim 3 wherein said bottom end flanges are fixed to said trailer side frame members by pins extending through said bores in said flanges and into openings in said trailer side frame members when said lower horizontal flanges of said lateral channel members are seated upon the trailer.

5. The device of claim 4 wherein said wheel carriers are dependingly supported through a lost motion connection from said framework by long bolts.

6. The device of claim 5 wherein said bolts include stop members thereon for limiting upward motion of said carriers relative to said cross pieces.

7. The device of claim 6 wherein said stop members are positioned on each bolt to permit, when said bag is deflated, said lower horizontal flanges of said lateral channel beams of said framework to seat against the trailer.

8. The device of claim 7 wherein said cross pieces of said framework are positioned in a manner to overlie each rail of said trailer upper surface.

* * * * *